US012746506B2

(12) United States Patent
Photos et al.

(10) Patent No.: US 12,746,506 B2
(45) Date of Patent: Sep. 29, 2026

(54) SYSTEM AND METHOD OF TREATMENT OF GAS CONTAMINATED WITH HYDROGEN SULFIDE AND THE REDUCTION OF HYDROGEN SULFIDE ASSOCIATED ODOR

(71) Applicant: Streamline Innovations Inc, San Antonio, TX (US)

(72) Inventors: Peter J. Photos, Boerne, TX (US); John C. Bourdon, Peculiar, MO (US); Douglas E. Cash, San Antonio, TX (US); Henry Wilmore Cox, Jr., Lexington, KY (US)

(73) Assignee: Streamline Innovations Inc, San Antonio, TX (US)

( * ) Notice: Subject to any disclaimer, the term of this patent is extended or adjusted under 35 U.S.C. 154(b) by 518 days.

(21) Appl. No.: 18/478,351

(22) Filed: Sep. 29, 2023

(65) Prior Publication Data

US 2025/0108328 A1 Apr. 3, 2025

(51) Int. Cl.
*B01D 53/52* (2006.01)
*B01D 53/79* (2006.01)
*C01B 17/64* (2006.01)

(52) U.S. Cl.
CPC ............. *B01D 53/52* (2013.01); *B01D 53/79* (2013.01); *C01B 17/64* (2013.01); *B01D 2257/304* (2013.01)

(58) Field of Classification Search
None
See application file for complete search history.

(56) References Cited

U.S. PATENT DOCUMENTS 2,901,326 A 8/1959 Kurata et al.
3,933,993 A * 1/1976 Salemme ............ B01D 53/485 423/576.6
4,414,067 A 11/1983 McCord
(Continued)

FOREIGN PATENT DOCUMENTS

GB 435287 A 9/1935

OTHER PUBLICATIONS

International Preliminary Report on Patentability issued Mar. 1, 2025 issued in PCT/US2023/073011.
(Continued)

*Primary Examiner* — Daniel Berns
(74) *Attorney, Agent, or Firm* — Jayne Saydah

(57) ABSTRACT

A method of reducing the hydrogen sulfide content of an influent gas stream comprising oxygenated gas and hydrogen sulfide. An aqueous stream including an available metal chelant and the influent gas stream are contacted using an eductor. The eductor releases an eductor effluent stream including a mixture of sulfur, a first treated gas including a lower concentration of hydrogen sulfide than the influent gas stream, a first unavailable metal chelant, the available metal chelant. The eductor effluent stream is received in a common vessel wherein a plurality of activities may be performed. The plurality of activities includes generating a second treated gas by reducing a metal of the available metal chelant and producing the aqueous stream of the available metal chelant by oxidizing the first or second unavailable metal chelant using the oxygenated gas.

8 Claims, 4 Drawing Sheets

(56) References Cited

U.S. PATENT DOCUMENTS

| | | | | |
|---|---|---|---|---|
| 4,525,338 | A | 6/1985 | Klee, Jr. | |
| 4,781,901 | A * | 11/1988 | Jeffrey | B01D 53/1462 423/226 |
| 4,784,775 | A | 11/1988 | Hardison | |
| 5,730,784 | A | 3/1998 | Smith et al. | |
| 6,100,081 | A | 8/2000 | Buelna | |
| 6,960,330 | B1 | 11/2005 | Cox, Jr. | |
| 7,144,555 | B1 | 12/2006 | Squires et al. | |
| 7,662,294 | B1 | 2/2010 | Cox, Jr. | |
| 7,846,408 | B1 | 12/2010 | Cox, Jr. | |
| 7,968,761 | B1 | 6/2011 | Cox, Jr. | |
| 8,480,924 | B1 | 7/2013 | Cox, Jr. | |
| 8,858,806 | B1 | 10/2014 | Cox, Jr. | |
| 8,937,210 | B1 | 1/2015 | Cox, Jr. | |
| 9,657,248 | B1 | 5/2017 | Cox, Jr. | |
| 9,701,556 | B1 | 7/2017 | Cox, Jr. | |
| 10,035,966 | B1 | 7/2018 | Cox, Jr. | |
| 10,131,558 | B1 | 11/2018 | Cox, Jr. et al. | |
| 10,639,585 | B2 | 5/2020 | Cox, Jr. | |
| 10,835,860 | B2 | 11/2020 | Cox, Jr. | |
| 2005/0036936 | A1 | 2/2005 | Christensen et al. | |
| 2010/0151552 | A1 | 6/2010 | Simmons | |
| 2012/0204599 | A1 | 8/2012 | Northrop et al. | |
| 2013/0123561 | A1 | 5/2013 | Nagl | |
| 2018/0200699 | A1 | 7/2018 | Tyurina et al. | |
| 2022/0401874 | A1 | 12/2022 | Zou et al. | |
| 2023/0381716 | A1 | 11/2023 | Photos et al. | |

OTHER PUBLICATIONS

International Search Report and Written Opinion dated May 23, 2025 issued in PCT/US2025/012933.

International Search Report dated Feb. 21, 2024 issued in PCT/US2023/073011.

Written Opinion dated Feb. 21, 2024 issued in PCT/US2023/073011.

* cited by examiner

SYSTEM AND METHOD OF TREATMENT OF GAS CONTAMINATED WITH HYDROGEN SULFIDE AND THE REDUCTION OF HYDROGEN SULFIDE ASSOCIATED ODOR

BACKGROUND OF THE DISCLOSURE

1. Field of the Invention

The present invention relates to a system and method of decreasing the concentration of hydrogen sulfide in oxygenated gas streams and thus, decreasing the noxious odor of air contaminated with hydrogen sulfide. More specifically, it relates to the use of an eductor and vessel for a reduction oxidation method to reduce the concentration of hydrogen sulfide ($H_2S$) in a gas stream contaminated with $H_2S$.

2. Description of the Related Art

The release of $H_2S$ into atmospheric air is a major problem for odor producers around the world. $H_2S$ is a colorless gas that has a foul odor (rotten egg smell) and is slightly heavier than air. Human exposure to small amounts of $H_2S$ in air can cause headaches, nausea, and eye irritation. Higher concentrations can cause respiratory system paralysis, resulting in fainting and possible death. Due to both the noxious odor and negative health effects of $H_2S$, treatment of a gas contaminated with $H_2S$ occurs prior to discharge of the gas into the atmosphere.

H2S contamination of oxygenated gas generally results from bacterial anaerobic digestion of organic material. As a result, common sources of malodorous air contaminated with $H_2S$ are sewage treatment systems (STSs). Within STSs, $H_2S$ contaminated gases may occur anywhere that bacterial anaerobic digestion occurs. However, treatment of oxygenated gas contaminated with $H_2S$ commonly occurs at lift or pumping stations as well as within treatment plants (e.g., treatment of gases generated in tanks as well as other processes). Other sources of oxygenated gas contaminated with $H_2S$ include fracking wastewater treatment ponds and the evacuation by venting of vapors from crude & produced water trucks and tanks.

Current methods of treating gas oxygenated gas contaminated with $H_2S$ are described in both U.S. Pat. Nos. 10,835,860 B2 and 10,639,585 which are entitled, "Treatment of Hydrogen Sulfide Gas Under Aerobic Conditions" and incorporated herein by reference in their entirety. These methods include contacting $H_2S$ contaminated air with an aqueous solution of a reagent such as ferric-methyglycin-ediacetate (F-MGDA). Contacting may occur by bubbling the contaminated gas through tall column contactors with or without media. The use of the tall column involves both initial capital expenses to build the tall column as well as a blower powerful enough to force the contaminated air through the column. Further, ongoing operational expenses occur due to the electricity required to operate the blower as well as the cleaning costs associated with solids build up and fouling of the media or diffuser, if applicable. Further, removal of the solids and fouling of the diffuser and/or media may require periods of system down time and/or replacement of the media or diffuser.

As a result, there is a need for a method of treating oxygenated gas contaminated with $H_2S$ that requires low initial capital expenses, lower operational costs, less solid accumulation, fowling, no media replacement and less system down time.

BRIEF SUMMARY OF THE DISCLOSURE

The invention of this disclosure provides an energy efficient and cost-effective system for desulfurization of an oxygenated gas stream contaminated with $H_2S$. An eductor contacts the gas stream contaminated with $H_2S$ and an aqueous solution of an available metal chelant or other reducing agent which provides a first reduction process. The eductor effluent may include sulfur, available reducing agent, unavailable reducing agent, treated gas and untreated gas, and the eductor effluent is received by a common vessel. Due to the composition of the influent oxygenated gas stream, both reduction and oxidation ("redox") occur within the common vessel. This allows a continual circulation, via a pump, of the aqueous solution of available reducing agent to the eductor motive injection inlet. Further, the pump provides the motive force to draft the contaminated gas stream into the eductor and mix with the aqueous solution of available reducing agent. Simultaneously, the common vessel may release, directly to the atmosphere, a treated or purified gas stream that has substantially less $H_2S$ than the contaminated gas stream and therefore, odor free or greatly odor reduced. Therefore, the pumping of the gas stream through the aqueous solution of reagent is not required. Further, the system may dropout sulfur, via precipitation, from gas stream without using a tall column packed tower or scrubber with or without media.

In some aspects, the techniques described herein relate to a method of treating an influent gas stream including an oxygenated gas and hydrogen sulfide, the method including steps of: contacting, in an eductor, the influent gas stream including the oxygenated gas and the hydrogen sulfide and an aqueous stream including an available metal chelant; releasing an eductor effluent stream including a mixture of sulfur, a first treated gas including a lower concentration of hydrogen sulfide than the influent gas stream, a first unavailable metal chelant, the available metal chelant; and receiving the eductor effluent stream in a common vessel and performing a plurality of activities including: generating a second treated gas by reducing a metal of the available metal chelant by forming bonds between sulfide ions of the hydrogen sulfide of the first treated gas and forming a second unavailable metal chelant; and producing the aqueous stream of the available metal chelant by oxidizing the first or second unavailable metal chelant using the oxygenated gas.

In some aspects, the techniques described herein relate to a method, further including a step of: removing sulfur from the common vessel.

In some aspects, the techniques described herein relate to a method, further including steps of: forming a release gas stream by separating the first treated gas or the second treated gas from the eductor effluent stream; and releasing the release gas stream from the common vessel.

In some aspects, the techniques described herein relate to a method, further including a step of: circulating the aqueous stream including the available metal chelant from the common vessel to an inlet of the eductor.

In some aspects, the techniques described herein relate to a method, further including a step of: drafting the influent gas stream including the oxygenated gas and the hydrogen sulfide into an opening in the eductor via a flow of the aqueous stream including available metal chelant through the eductor.

In some aspects, the techniques described herein relate to a method, wherein the step of circulating the aqueous stream including the available metal chelant further includes a step of: using a pump to force the aqueous stream including the available metal chelant to circulate from the common vessel to the inlet of the eductor.

In some aspects, the techniques described herein relate to a method, further including steps of: producing a desulfurized portion of the aqueous stream including available metal chelant stream; and returning the desulfurized portion to the common vessel.

In some aspects, the techniques described herein relate to a method, further including a step of: producing a thiosulfate.

In some aspects, the techniques described herein relate to a method of producing thiosulfate, the method including steps of: producing thiosulfate by contacting an aqueous metal chelant stream and an influent gas stream including oxygenated gas and hydrogen sulfide.

In some aspects, the techniques described herein relate to a method, wherein the step of producing thiosulfate further includes steps of: allowing sulfide ions of the hydrogen sulfide to combine with oxygen ions of the oxygenated gas to form the thiosulfate.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE DISCLOSURE

Certain terminology is used in the following description for convenience only and is not limiting. As used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Figure 1:
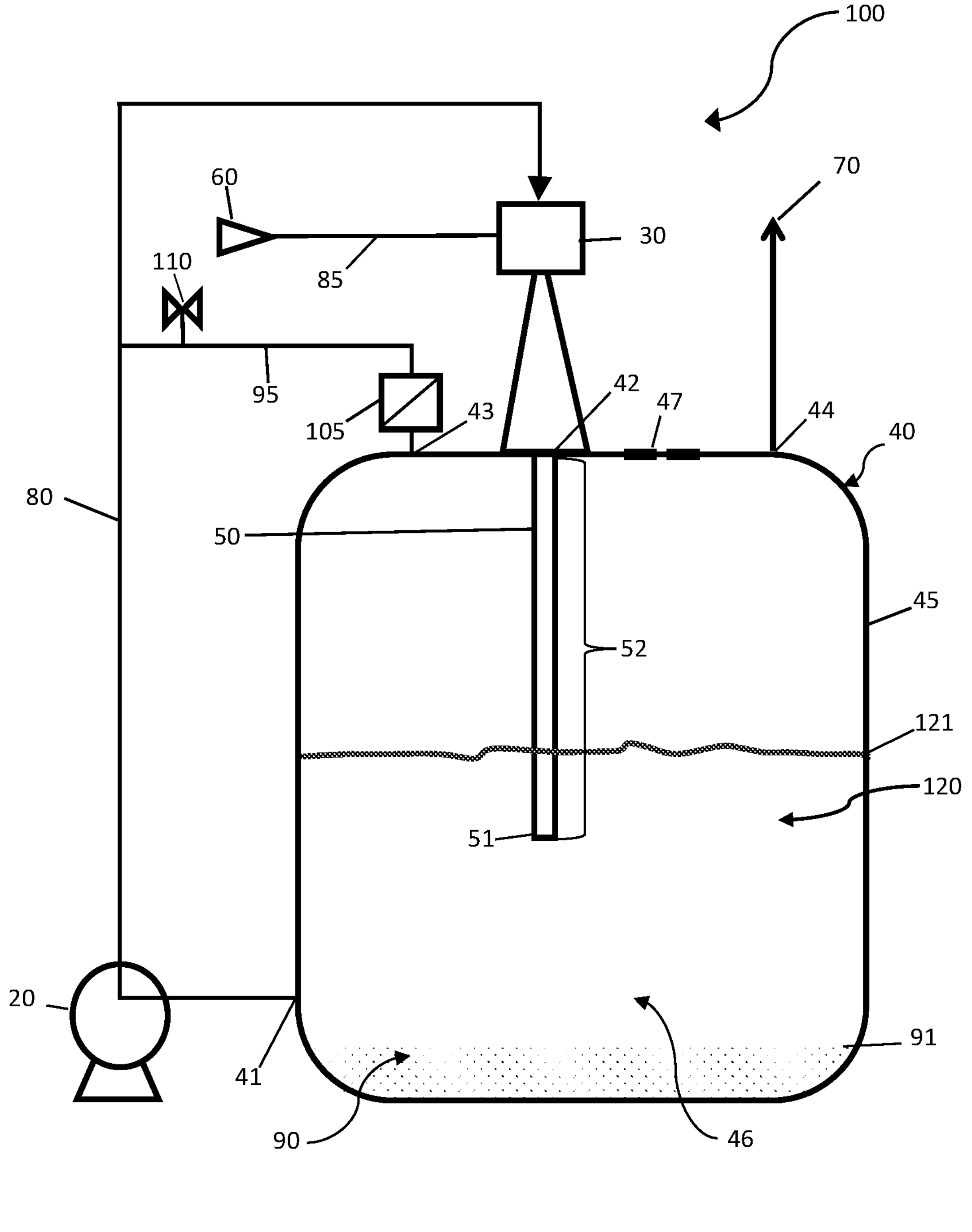
FIG. 1 is schematic diagram of an embodiment, according to this disclosure, of a gas treatment system.

Referring now to the figures in detail, where like numbers are used to indicate like elements throughout, there is shown in FIG. 1 a gas treatment system 100 for purification or treatment of an influent gas stream 85 including an oxygenated gas stream contaminated with $H_2S$. System 100 includes an aqueous reducing agent or aqueous metal chelant stream 80, influent gas stream 85, eductor 30, common vessel 40, pump 20, gas inlet 60, downcomer 50, and desulfurize unit 105.

System 100 may prevent the noxious odor caused by $H_2S$ releases from STSs to atmospheric air. This may be accomplished by directly connecting the gas inlet 60 to the source 10 of an oxygenated gas stream contaminated with $H_2S$. Rather than be released directly to the atmosphere, the contaminated influent gas stream 85 is treated by reducing the concentration of $H_2S$ to an acceptable level.

The metal chelant stream 80 is a reducing agent stream of an aqueous solution of a metal chelant including one or more of ferric salts, ferrous salts, ferric chelants, ferrous chelants, nano-iron, colloidal iron, Fe-MGDA (ferric/ferrous methylglycinediacetate) such as Alanine, n,n-bid, (carboxymethyl) iron complex (CAS 547763-83-7), natural heme separated from natural organisms, whole organisms such as bacteria or yeast which include heme, and biosynthesized heme, etc. If stream 80 includes biosynthesized heme, a metallic porphyrin, such as iron porphyrins, may be preferred. Biosynthesized heme may be produced through recombinant DNA and genetic engineering of yeast. An example the biosynthesis of heme is described in U.S. Pat. Nos. 9,938,327 and 10,689,656 issued Apr. 10, 2018 and on Jun. 23, 2020, respectively, both of which are entitled "Expression Constructs and Methods of Genetically Engineering Methylotrophic Yeast", and the contents of both applications are herein incorporated by reference in their entirety.

Gas inlet 60 allows system 100 to pull the influent gas stream 85 into eductor 30. The gas inlet 60 may be directly connected to source 10 of influent gas stream 85. That is, inlet 60 may be connected to various apparatuses in a STSs including lift stations, sewage treatment tanks, etc.

Influent gas stream 85 may include any oxygenated gas contaminated with $H_2S$. For example, sewage tanks and sewer pipes may be open to the atmosphere and allow air to enter the STS. As a result, the influent gas stream 85 pulled from the tanks and lift stations includes air and is therefore oxygenated.

Figure 2:
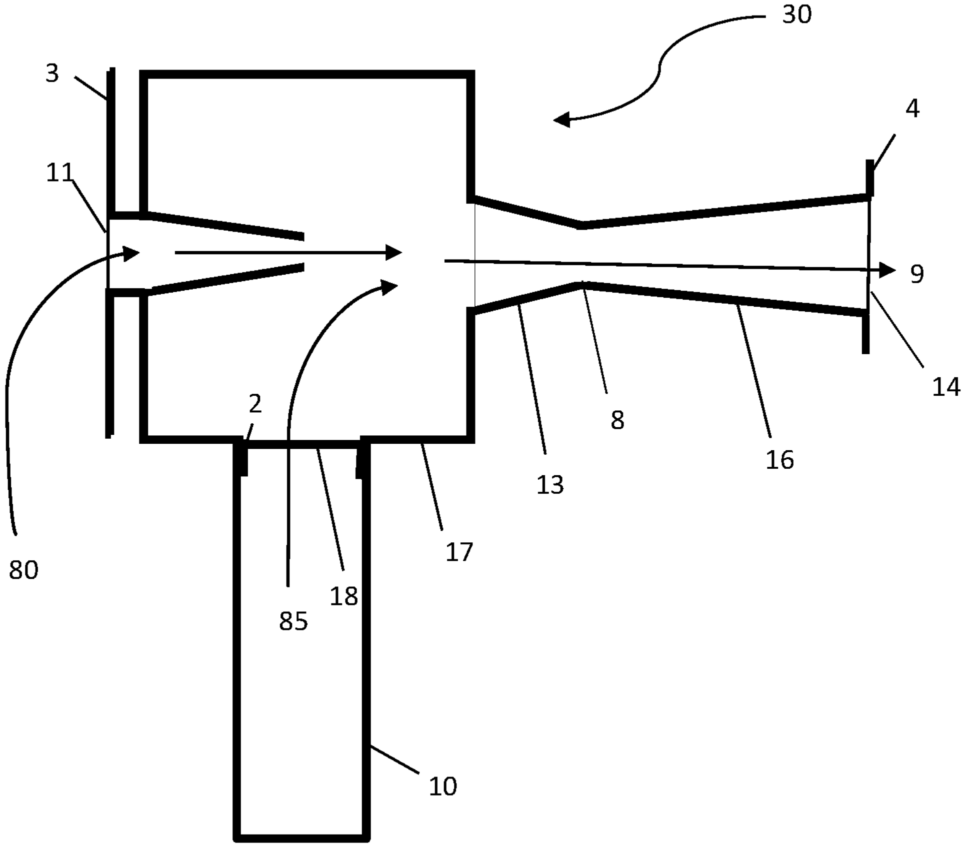
FIG. 2 depicts an example of an eductor, according to this disclosure.

FIG. 2 depicts an example of eductor 30, according to this disclosure. The eductor 30 includes a motive fluid inlet 11, an entrained fluid inlet 18, an outlet nozzle 14, a chamber 17, converging length 13, narrowing throat 8, and a diverging length 16. During operation, the narrowing throat 8 causes extreme turbulence due to the Venturi effect. The motive fluid is the aqueous metal chelant stream 80 which pumped, via pump 20, into the motive fluid inlet 11 and drafts or entrains the influent gas stream 85 to enter entrained fluid inlet 18. Once inside eductor 30, contact of metal chelant stream 80 and influent gas stream 85 occurs in chamber 17, and the converging length 13. Next, the narrowing throat 8 causes such turbulence that contacting continues through the diverging length 16 and beyond the outlet nozzle 14.

When metal chelant of stream 80 contacts the $H_2S$ in gas stream 85, the sulfide ions in the $H_2S$ combine to form sulfur 90 while the metal is reduced. For example, when an iron chelate is used as the reducing agent, a reduction reaction occurs as follows:

$$\text{Reduction: } H_2S(g) + 2Fe^{3+}(aq) \rightarrow 2H^+(aq) + S(s) + 2Fe^{2+}(aq).$$

As result, the eductor effluent stream 9 may be a fluid mixture comprising available metal chelant, unavailable metal chelant, elemental sulfur 90, treated gas and untreated gas. The sulfur 90 precipitates and is suspended in stream 9 and bulk volume of fluid 120. The available metal chelant refers to chelant that still may be reduced by reaction with $H_2S$, and the unavailable metal chelant requires regeneration via oxidation before it may react with $H_2S$.

Downcomer 50 may be connected to the eductor outlet nozzle 14 and transfers eductor effluent stream 9 to vessel 40. Downcomer 50 may be a solid pipe or conduit with a length suitable transferring the eductor effluent stream 9 to the fluid level 121 in vessel 40. That is, the downcomer outlet 51 should be positioned under the fluid level 121. Further, the downcomer outlet 51 may be a slotted opening (not shown). It is noted that downcomer 50 is an optional element of system 100, and the eductor effluent stream 9 may flow directly into vessel 40 without the downcomer 50.

Common vessel 40 may be connected to the eductor outlet nozzle 14 and includes a sidewall 45 defining chamber 46 such that vessel 40 is airtight or environmentally sealed. Sidewall 45 may include treated gas outlet 44, metal chelant outlet 41, eductor effluent stream inlet 42, and filtration stream inlet 43, if applicable. The downcomer 50 may be positioned within the eductor outlet nozzle 14 and descend into chamber 46 via eductor effluent stream inlet 42.

Multiple activities are performed by vessel 40. Chamber 46 receives the eductor effluent stream 9 via downcomer 50 and stores stream 9 as fluid 120. As vessel 40 holds fluid 120, vessel 40 allows the purified or treated release gas stream 70 to separate from the fluid 120 and be released to the atmosphere via outlet 44. The treated gas stream 70 includes purified air with a lower $H_2S$ concentration, as compared to the influent gas stream 85, and reduced or little to no odor caused by $H_2S$. For example, the $H_2S$ concentration of the treated gas stream 70 may be in the range of about 10 ppm or less.

Vessel 40, also, allows for the separation of sulfur from fluid 120. Initially, the sulfur is suspended in fluid 120, but as fluid 120 resides in vessel 40, the sulfur 90 settles to bottom of chamber 46.

Other activities within vessel 40 include simultaneous reduction oxidation ("redox") reactions. Due to the turbulence generated in stream 9, resulting from the Venturi effect of eductor 30, stream 9 continually imparts turbulence within fluid 120 so mixing continually occurs. As a result, chamber 46 provides a second opportunity for contact between the available metal chelant and untreated gas found in the eductor effluent stream 9, and the reduction reaction proceeds within vessel 40. Thus, vessel 40 provides additional or secondary contact through which the sulfide ions in the $H_2S$ of the untreated gas combine to form sulfur 90 and the charge of the metal in the available reagent is reduced.

Simultaneously, the regeneration of the unavailable metal chelant occurs through an oxidation reaction. The influent gas stream 85 is an oxygenated gas stream that provides oxygen to act as the oxidizer. Assuming the reducing agent is an iron chelate, the oxidation reaction would be as follows:

$$\text{Oxidation: } 2H^+(aq) + 2Fe^{2+}(aq) + 0.5\,O_2(g) \rightarrow 2Fe^{3+}(aq) + H_2O(l).$$

Thus, the unavailable metal chelant is oxidized to return to available metal chelant.

Another possible activity within vessel 40 includes the production of thiosulfate ($S_2O_3^{2-}$). An oxygen enriched stream, such as the influent gas stream 85, may react with sulfide ions in an alkaline solution to produce thiosulfate ($S_2O_3^{2-}$). Initially, this reaction will create sulfite ions. These ions are reducing and may react with monoatomic sulfur producing thiosulfate as a result. The reaction may proceed as follows:

$$\text{First Step: } OH^- + HS^- + 0_2 \rightarrow SO3^{2-} + 2H^+$$

$$\text{Second Step: } S_0 + SO_3^{2-} \rightarrow S_2O_3^{2-}.$$

The available metal chelant stream 80 is withdrawn from vessel 40 via outlet 41 and continually circulating to motive fluid inlet 11 of eductor 30. Pump 20 provides the motive force to stream 80 which serves as the motive fluid for eductor 30. Pump 20 may be positioned downstream of vessel 40 so as to receive the stream 80 from chamber 46.

As stream 80 is withdrawn from vessel 40, fluid 120 may include sulfur 90, and available and unavailable metal chelant. To maximize the concentration of available metal chelant in stream 80, outlet 41 is positioned above settling level 91 of the sulfur. Also, outlet 41 may be positioned below the level of downcomer 50 to reduce the amount of gas present in stream 80.

Optionally, a desulfurized stream 95 may branch from metal chelant stream 80 and return a desulfurized portion of the metal chelant stream 80 to vessel 40 via inlet 43. Desulfurize stream 95 includes a sulfur filtration unit 105. Valve 110 on stream 95 allows control of stream 80 into stream 95.

Figure 3:
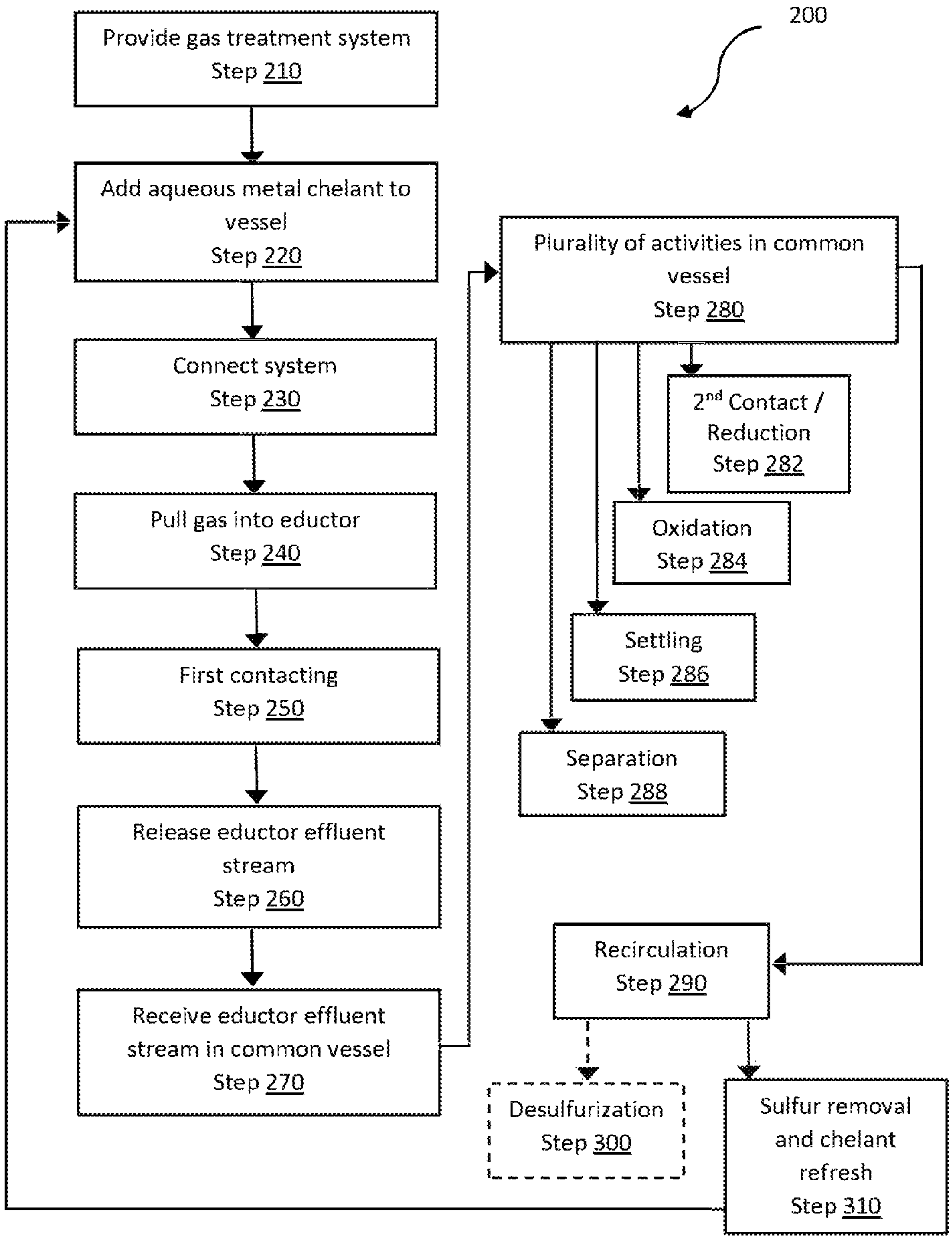
FIG. 3 is a flow diagram of a method, according to this disclosure, of a method of treating an influent gas stream comprising an oxygenated gas stream and $H_2S$.

FIG. 3 is a flow chart of method 200 of treating an influent gas stream comprising an oxygenated gas stream and $H_2S$, reducing odor associated with $H_2S$ contaminated air and/or a method of producing thiosulfate and/or a method of producing sulfur. Initially, in step 210, system 100 of FIG. 1 is provided. Next, in step 220, the aqueous metal chelant is selected and added to the common vessel 40 so that fluid 120 initially includes aqueous metal chelant stream 80. Vessel 40 should be filled until fluid level 121 within vessel 40 will be higher than downcomer outlet 51 even after the aqueous metal chelant stream 80, eductor 30 and desulfurize stream 95, if applicable, are filled with the metal chelant stream 80.

In step 230, system 100 is directly connected to source 10 of stream 85. This may be done by directly connecting inlet 60 to source (i.e., open or vented tank, lift station, bio solids tank, etc.) or a conduit 10 (FIG. 2) extending from the source.

In step 240, pump 20 is activated and forces the aqueous metal chelant stream 80 to recirculate from common vessel 40 to the eductor inlet 11. The influent gas stream 85 is pulled through gas inlet 60 into eductor 30 via entrained fluid inlet 18.

Step 250 includes a first contacting or reduction process. Streams 85 and 80 are contacted in eductor chamber 17, converging length 13 and diverging length 16. As a result of this contacting, the reduction reaction occurs, and the sulfide ions in the $H_2S$ react combine to form sulfur 90 while reducing the metal of the aqueous metal chelant.

Step 260 includes releasing an eductor effluent stream 9. While the narrowing throat 8 causes extreme turbulence, via the Venturi effect, complete contacting between streams 80 and 85 may not occur. As a result, the eductor effluent stream may be a mixture of various components including sulfur 90, treated gas, a first unavailable metal chelant, the available metal chelant and a first treated gas stream. The first treated gas includes a relatively lower concentration of $H_2S$ than influent gas stream 85.

The first unavailable metal chelant is a form of chelant that has underdone the reduction reaction. As a result, the first unavailable metal chelant is a reduced metal chelant relative to the available metal chelant. For example, in the reduction reaction including an iron chelant $2Fe^{3+}$(aq) becomes $2Fe^{2+}$(aq) when the sulfide ions combine. The unavailable metal chelant may also include intermediaries such as the chelant saturated with sulfide ions.

In step 270, eductor effluent stream 9 is received by common vessel 40 via inlet 41. Stream 9 may first be received by downcomer 50, if applicable, and then released into the common vessel 40. Once in the common vessel 40, the eductor effluent stream 9 forms fluid 120.

Step 280 may include a plurality of activities (steps 282, 284, 286, 288, 289) occurring simultaneously within vessel 40.

Step 282 includes generating a second treated gas by reducing a metal of the available metal chelant as bonds are formed between sulfide ions of the hydrogen sulfide of the first treated gas and forming a second unavailable metal chelant. This is the second reduction reaction occurring in method 200 to reduce or treat the $H_2S$ concentration in the influent gas stream. Any untreated influent gas released from the eductor 30 may be treated within vessel 40. As a result, an effluent gas stream or treated gas stream 70 of the second reduction process may be odor and $H_2S$ free or significantly $H_2S$ reduced and purified.

Simultaneously, in step 284, the unavailable metal chelant is oxidized with the oxygen and the influent gas stream 85. This allows the unavailable chelant to be regenerated to available chelant.

In step 286, vessel 40 acts as a settling vessel allowing sulfur 90 to settle to the bottom of vessel 40 and may settle out of fluid 120.

In step 288, vessel 40 acts as a separation vessel to release treated gas stream 70 via outlet 44. That is, the first and/or second treated gases are separated from fluid 120 and released as stream 70.

In step 289, thiosulfate may be produced within vessel 40 as discussed above.

In step 290, the aqueous available metal chelant stream 80 is released from vessel 40 via outlet 41 and recirculated to motive fluid inlet 11 of eductor 30. Pump 20 imparts the motive force to stream 80.

Optionally, step 300 may be performed when desulfurization of stream 80 is required. Step 300 includes generating a desulfurized stream 95 from the aqueous available metal chelant stream 80. The desulfurized stream 95 is a portion of stream 80 that branches from stream 80 and is fed through a sulfur filtration unit 105. Next, the desulfurized stream 95 is returned to common vessel 40. This process allows the sulfur in stream 80 to be decreased. Step 300 is depicted with a dash box on FIG. 3 because it is optional.

Step 310 includes removal of sulfur 90 from vessel 40 and possibly refreshing the aqueous available metal chelant stream 80. The timing of this step may be triggered by at least two factors. First, through the ongoing operation of system 100, sulfur 90 settles on the bottom of vessel 40. The amount of sulfur 90 accumulation may vary depending on the $H_2S$ concentration in the influent gas stream 85. Thus, the cleaning may be done periodically as needed. When completing the removal of sulfur 90, additional metal chelant may need to be added to the vessel 40 before operation of system may occur. To accomplish this, method 200 of operation of system 100 may revert to step 220.

The second factor that triggers the need to refresh includes a decrease in the concentration of available metal chelant in stream 80. Although the available metal chelant is continually refreshed via simultaneous reduction and oxidation reactions occurring in vessel 40, other reactions may also occur and produce products such as thiosulfate. The concentration of available metal chelant decreases as the concentration of products such as sulfur and thiosulfate increases and eventually the fluid 120 of vessel 40 will require replacement or refreshing.

When either the sulfur content or the thiosulfate concentration within vessel 40 is too great for efficient processing, system 100 may be taken offline. Then, vessel 40 is emptied of the sulfur 90 and/or fluid 120. Next, step 220 is performed and system 100 is operated in accordance with the remainder of steps provided in method 200.

Figure 4:
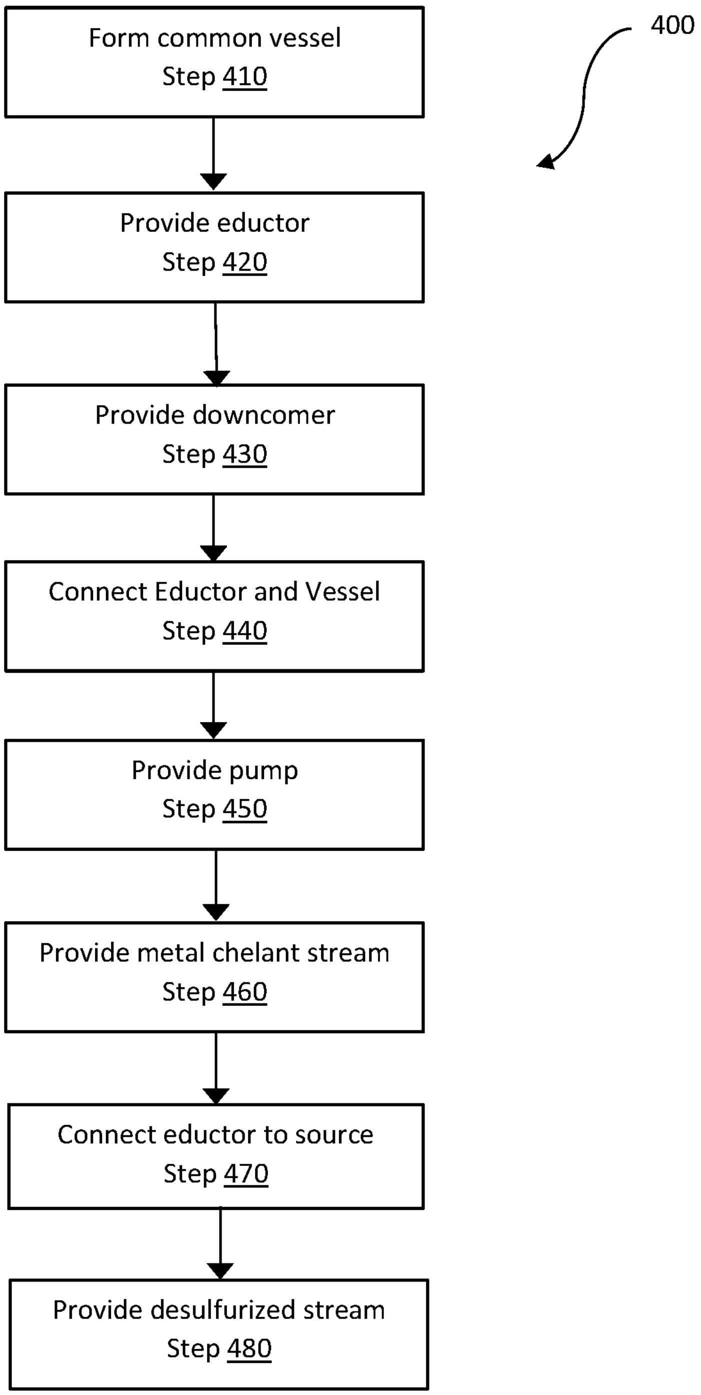
FIG. 4 is a flow diagram of a method, according to this disclosure, of making the gas treatment system depicted in FIG. 1.

FIG. 4 depicts method 400 of manufacturing system 100.

In step 410, common vessel 40 is manufactured with the inlets 42, 43 and outlets 41, 44 as described above. The common vessel 40 is a hollow tank that is sealed from the environment except for the inlets and outs provided about. Additionally, vessel 40 should have an opening 47 through which the sulfur 90 may be removed. Although FIG. 4, depicts opening 47 on top portion of side wall 45, opening 47 may be placed at any convenient location of vessel 40. Vessel 40 may be formed through methods known in the art and from materials such as fiberglass, steel, metal alloys, plastics, etc.

In step 420, eductor 30 is provided as discussed above. That is, eductor 30 includes a motive fluid inlet 11, entrained fluid inlet 18 and outlet nozzle 14 which are each configured for connection to streams 80, 85 and vessel 40, respectively. Inlets 11, 18, and outlet nozzle 14 and may include corresponding connectors 3, 2 and 4 suitable for connecting respective streams 80, 85 and vessel 40. Suitable connectors 2, 3, 4 include flange, as shown, or threads disposed on inlets 11, 18 and nozzle outlet 14 or other suitable connectors.

In step 430, downcomer 50, if desired, is provided and connected to outlet nozzle 14. The downcomer 50 may be formed of steel, or a metal alloy, etc. and should include a length 52 that is long enough to connect to eductor outlet nozzle 14 and descend into vessel 40 such that downcomer outlet 51 is positioned below fluid level 121 but above outlet 41. The connection of downcomer 50 to the outlet nozzle 14 may be accomplished through welding, press fit, or any other connection on the upper end of the downcomer 50.

In step 440, eductor 30 and vessel 40 may be connected to each other at inlet 42. The connection may be established via suitable connection such as using flange 4 to bolt or weld eductor outlet nozzle 14 and vessel 40 together using the threads.

In step 450, pump 20 is provided and may be a centrifugal or vertical pump or any other suitable pump.

In step 460, stream 80 is provided and connected to vessel 40, pump 20 and eductor 30. One end of stream 80 is connected to outlet 41 of vessel 40 and the other end is connected to inlet 11 of eductor 30. Pump 20 is placed on stream 80 such that it receives stream 80 from outlet 41 and forces stream 80 to inlet 11.

In step 470, eductor inlet 18 is connected to a source 10 of oxygenated gas contaminated with $H_2S$ such that stream 85 may be pulled directly into the eductor 30 during operation of system 100. The connection of inlet 18 and stream 85 may be completed by methods known in the art such as bolting or welding, etc. flange 2 to gas source. Also, conduit 10 may be connected between flange 2 and the source.

Optionally, step 480 may be performed in and includes providing a desulfurized stream 95 as a branch from stream 80 that discharges to vessel 40 via inlet 43. Stream 95 may include a valve 110 and a sulfur removal unit 105 which may be a bag filter, cyclic separator such as a desander, or other suitable sulfur removal unit.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

The invention claimed is:

1. A method of treating an influent gas stream comprising an oxygenated gas and hydrogen sulfide, the method comprises:

contacting, in an eductor, the influent gas stream comprising the oxygenated gas and the hydrogen sulfide and an aqueous stream including an available metal chelant;

releasing an eductor effluent stream including a mixture of sulfur, a first treated gas including a lower concentration of hydrogen sulfide than the influent gas stream, a first unavailable metal chelant, the available metal chelant; and receiving the eductor effluent stream in a common vessel and performing a plurality of activities including:

generating a second treated gas by reducing a metal of the available metal chelant by forming bonds between sulfide ions of the hydrogen sulfide of the first treated gas and forming a second unavailable metal chelant; and producing the aqueous stream of the available metal chelant by oxidizing the first or second unavailable metal chelant using the oxygenated gas.

2. The method of claim 1, further comprising:

removing sulfur from the common vessel.

3. The method of claim 1, further comprising:

forming a release gas stream by separating the first treated gas or the second treated gas from the eductor effluent stream; and releasing the release gas stream from the common vessel.

4. The method of claim 1, further comprising:

circulating the aqueous stream including the available metal chelant from the common vessel to an inlet of the eductor.

5. The method of claim 4, further comprising:

drafting the influent gas stream comprising the oxygenated gas and the hydrogen sulfide into an opening in the eductor via a flow of the aqueous stream including available metal chelant through the eductor.

6. The method of claim 4, wherein circulating the aqueous stream including the available metal chelant further comprises:

using a pump to force the aqueous stream including the available metal chelant to circulate from the common vessel to the inlet of the eductor.

7. The method of claim 1, further comprising:

producing a desulfurized portion of the aqueous stream including available metal chelant stream; and returning the desulfurized portion to the common vessel.

8. The method of claim 1, further comprising:

producing a thiosulfate.

* * * * *